United States Patent Office 3,682,779
Patented Aug. 8, 1972

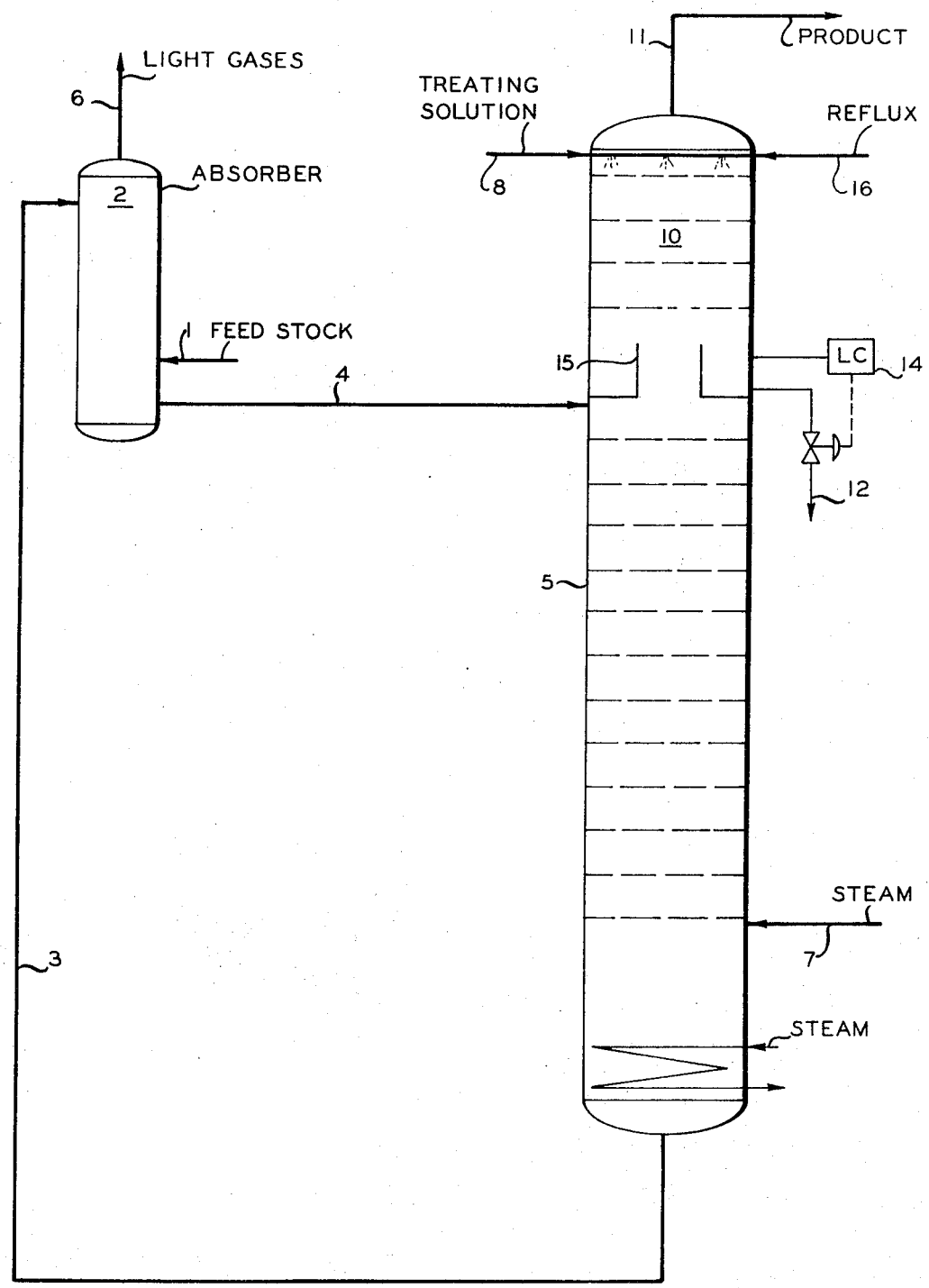

3,682,779
REMOVAL OF CARBONYL COMPOUNDS, RESIDUAL OXYGEN AND OTHER IMPURITIES FROM HYDROCARBON DEHYDROGENATION EFFLUENT
Ronald E. Ritter and Thomas Hutson, Jr., Bartlesville, Okla., assignors to Phillips Petroleum Company
Filed Sept. 19, 1969, Ser. No. 859,387
Int. Cl. B01d 3/34, 3/38
U.S. Cl. 203—7                          6 Claims

ABSTRACT OF THE DISCLOSURE

Carbonyl compounds and residual oxygen are removed from hydrocarbon dehydrogenation effluent containing rich oil stripper overhead vapors, prior to condensing hydrocarbon product, with water solution spray, e.g., 1 weight percent KOH, to remove carbonyl compounds and 1 weight percent bisulfite or nitrite solution to remove oxygen and organic acids. A combination of agents can be used. The water solution and removed materials along with steam condensate are removed from a suitable tray in the stripper. The $C_4$ or $C_5$ olefins contained in dehydrogenation effluent after absorption into an oil are recovered therefrom in a stripper to which the spray is fed.

---

This invention relates to the treatment of a hydrocarbon dehydrogenation effluent. More particularly, it relates to the treatment of $C_4$ and/or $C_5$ olefin dehydrogenation effluent to remove carbonyls, residual oxygen and other materials therefrom. In one embodiment the invention relates to the purification and recovery of high-purity butadiene. In another embodiment the invention relates to the recovery of high-purity isoprene.

In one of its concepts the invention provides a method for the treatment of hydrocarbon dehydrogenation effluent to remove therefrom carbonyl compounds, residual oxygen and the like which may be present which comprises separating, by means of a lean oil absorption technique, the bulk of the gases in said effluent, recovering from the now rich oil the dehydrogenation products by stripping them from said oil in a stripping zone, preferably employing a stripping agent, e.g., steam, and treating the vapors in said stripping zone with a water-solution spray containing at least one agent adapted to remove from the vapors the contaminants herein discussed, collecting the spray solution and removing the same from said stripping zone. In another of its concepts the invention provides a method as described herein in which butadiene-containing hydrocarbon dehydrogenation effluent is recovered from an absorption oil in a stripping zone, preferably with the aid of steam, and there is added to the vapor processing portion of said stripping zone a water solution which can contain an alkali material, e.g., KOH, and/or a bisulfite and/or a nitrite, the solution which has contacted the vapors is then collected and removed from the stripping zone.

In the oxidative dehydrogenation process for conversion of butenes to butadiene and for the conversion of isoamylenes to isoprene, carbonyl by-products and residual oxygen will be present in the effluent from the stripping zone in which the desired products are recovered. The carbonyls are aliphatic, water-soluble, oxygenated compounds such as aldehydes, ketones, and acids. The dehydrogenation effluent may thus contain acetaldehyde, propionaldehyde, crotonaldehyde, acrolein, formaldehyde, methyl vinyl ketone, acetone, acetic and propionic acids, etc. The percentage of these compounds will usually be about 0.05 to 1.0 percent of the dehydrogenation effluent.

Presently, the reactor effluent is passed through an absorption operation in which $C_4$ or $C_5$ hydrocarbons are absorbed in a lean oil. During the absorption step gases are vented and ordinarily discharged to the atmosphere or to a flare to avoid atmospheric pollution. Resulting rich oil is passed to a stripping column in which steam is used to remove the $C_4$ or $C_5$ hydrocarbons from the oil. Steam is condensed in the upper portion of the column by recycling liquid $C_4$ or $C_5$ hydrocarbons to an upper tray in the column. The hydrocarbon vapors thus stripped from the oil are taken overhead, condensed and collected in a product surge tank.

In the absorption step, nearly all residual oxygen in the reactor effluent is vented. Carbonyls which are produced in the reactor are carried out in the water condensed from the effluent. However, small amounts of remaining oxygen ordinarily approximately 50 to approximately 100 parts per million are present tending to form peroxide approximately 10–15 parts per million in the $C_4$ or $C_5$ hydrocarbon product surge tank. This invention deals with the removal of this residual oxygen along with smaller residual amounts of other materials as herein discussed.

The removal of the residual oxygen by nitrite scrubbing has been inhibited by small amounts of organic acids which are not lost to the reactor effluent condensate. The acids neutralize the nitrite solution rendering it ineffective for oxygen removal and further add to the hazard of possible explosive organic nitrates which form in acidic media.

It has now been discovered by us that we can remove the organic acids and/or residual oxygen from the stripper overhead vapors before the hydrocarbon product is condensed and that we can do so by replacing at least a part of the liquid hydrocarbon recycle at the top of the column, or precede the same, with a water solution spray, containing a suitable agent as herein discussed. Thus, the organic acids and residual oxygen can be washed out of the hydrocarbon product.

One skilled in the art in possession of this disclosure having studied the same will understand what are or can be the agents which can be used in the spray. Further, the water is now preferred. It is within the scope of the invention to make a substitution therefor. The amount of the effective agent in the water, in addition to the effectiveness of the water, can be determined by mere routine test. Presently approximately 0.1–1.5 weight percent concentration, employing a sufficient volume of spray, will effectively remove the organic acids and residual oxygen, thus to avoid the formation of the peroxides and other disadvantageous materials, as described.

An object of this invention is to provide a method for the purification of a hydrocarbon dehydrogenation product effluent. Another object of the invention is to provide a method for the removal of carbonyls from such an effluent. A further object of the invention is to provide a method for the removal of residual oxygen from such an effluent. A still further object of the invention is to provide a modus operandi for the removal of impurities from a hydrocarbon dehydrogenation product effluent while at least a portion thereof is in vapor phase. A further object of the invention is to provide a method of treating hydrocarbon vapors in a stripping operation in which such vapors are being recovered to remove from said vapors carbonyls and/or residual oxygen and other contaminants as herein described. A further object of the invention is to provide for the purification of olefin dehydrogenation product effluent, containing butadiene, to remove therefrom carbonyls and/or residual oxygen which tend to produce peroxides in the product. A still further object of the invention is to avoid the use of explosive organic nitrate-producing agents which produce in acidic media such nitrates.

Other aspects, concepts, and objects of this invention are apparent from a study of this disclosure, the drawing and the appended claims.

According to the present invention a hydrocarbon dehydrogenation product effluent containing impurities described is treated in vapor phase with a countercurrent flow or spray of a solution containing an agent adapted to dissolve or to react with such impurities.

In one embodiment of the invention butadiene-containing olefin dehydrogenation product effluent is first absorbed in a lean oil thus to separate the same from gases which are vented. A rich oil containing butadiene which is to be further treated is then passed to a stripping zone in which butadiene and other absorbed constituents of the effluent now contained in said oil are stripped therefrom. Preferably, steam or equivalent stripping agent is employed. In the embodiment now described the stripping zone is comprised within a stripping column having a vapor dephlegmation zone. This zone or section prevents loss of oil and also causes condensation of some of the steam and mist which may be generated in the tower. There is supplied just above the dephlegmation zone a 1 weight percent water solution of bisulfite for contact with the hydrocarbon vapors passing upwardly through the column. The water solution and some condensed steam are collected and removed from the tower at a point above the dephlegmation section thereof. $C_4$ hydrocarbon product removed from the tower as overhead is passed to a condenser and product surge tank.

With reference to the drawing a dehydrogenation effluent resulting from oxidative dehydrogenation of an olefin stream, containing $C_4$ olefin, e.g., butene-1 and butene-2, and containing upon dehydrogenation, as described, butadiene, some butene-1 and some butene-2 as well as carbonyls, residual oxygen, nitrogen, carbon oxides, light hydrocarbons, e.g., ethylene, propane, propylene and methane, and some organic acids is passed by 1 into absorber 2 for absorption into lean oil entering from 3. Rich oil is passed by 4 to column 5 while gases are vented at 6. Steam is introduced to colum 5 at 7.

According to the invention, in lieu of all or part of the currently practiced introduction of liquid hydrocarbons there is introduced to the tower 5 at 8 a water solution of bisulfite which may contain some KOH or soda ash. This solution is distributed by spray means 9 into countercurrent contact with vapors rising through the column just above dephlegmation zone 10. The treating solution is removed from the tower by means of "trap-out" or doughnut tray 15 and finally through pipe 12. The treating solution is wholly or at least in part recycled to 8 with a part discarded or regenerated.

It may also be desirable to pass some hydrocarbon reflux to the upper portion of tower 5 through pipe 16. This is obtained by conventional condensation of overhead stream 11. Hydrocarbon reflux will not generally be required, however. Lean oil is removed at 3 from the bottom of column 5. Overhead vapors containing $C_4$ hydrocarbon product, from which carbonyls and residual oxygen, etc., have now been removed, are passed by 11 to a storage tank not shown.

As can be seen from the drawing, level controller 14 is provided to maintain suitable levels of liquid in the dephlegmation zone of the tower. Other conventional controls have been omitted.

The following tabulation gives flow rates and conditions in the stripper used on butene dehydrogenation effluent, said stripper containing 50 trays, had a diameter of approximately 3½ feet and was 85 feet tall.

| Tower | Temperature, °F. | P.s.i.g. |
|---|---|---|
| Top | 130 | 70 |
| Bottom | 375 | 75 |

| Stream: | G.p.h. | Temperature, °F. |
|---|---|---|
| 4 | 6,770 | ¹ 385 |
| 7 | | |
| 8 | 6,220 | ¹ 130 |
| 11 | 120 | |
| 12 | 6,550 | |

¹ Steam 3,000 lbs./hr. $H_2O$ plus 1 weight percent sodium bisulfite.

It will be obvious to one skilled in the art in possession of this disclosure, having studied the same, that the concept basic to the invention is in the treatment of the vapors in the stripping zone or tower. Variations in kinds of feeds treated and in treating agents can be routinely made. Further, conditions and flow rates can be varied to suit the particular problem at hand.

Additional advantages flow from the invention. For example, there is the added benefit of the use of the solutions as described in considerably lowering corrosion rates in the upper stripper internals. Ordinarily the material of construction is carbon steel. The basic solutions reduce or eliminate corrosion problems due to the organic acids. Thus, formerly, a pH of 4.5 on the dephlegmator tray where the stripping steam condenes is increased to about 8.0 by the use of treating solutions as described.

The washing of the hydrocarbon vapors, as described, removes up to about 90 percent of carbonyls which are undesirable in the final product. Though some of these compounds can be removed by fractionation, elimination or reduction of them before the butadiene purification steps, which follow after the stripping here described, will aid in producing a higher purity butadiene and considerably reduce the possibility of obtaining an off-specification product. Acetaldehyde and 1,3-butadiene, for example, form an azeotrope and therefore cannot be separated by conventional fractionation.

While the invention has been more specifically described for the recovery of butadiene from the oxidative dehydrogenation of butenes, it is equally applicable to the recovery of isoprene from the oxidative dehydrogenation of isoamylenes.

Reasonable variation and modification are possible within the scope of the foregoing disclosure, drawing and the appended claims to the invention the essence of which is that vapors containing carbonyls and/or residual oxygen and other undesired impurities, for example, as resulting from the oxidative dehydrogenation of hydrocarbons, e.g., olefin hydrocarbons, are treated with a solution, preferably a water solution of an agent at the point at which such vapors are recovered from an absorption oil as described.

I claim:

1. In the recovery of vapors from an absorption oil containing the same, said vapors containing carbonyls and/or residual oxygen, the steps which comprise in a unitary stripping zone stripping said vapors from said absorption oil, treating said vapors in said stripping zone countercurrently with a solution of a chemical treating agent which will remove the carbonyls and/or oxygen, removing said treating agent containing said carbonyls and/or oxygen from said stripping zone and separately from the removal of said treating agent recovering from said zone vapors thus treated.

2. A method according to claim 1 wherein the vapors result from an oxidative dehydrogenation of olefin hydrocarbons, the oxidative dehydrogenation effluent has been absorbed in an absorption oil, the absorption oil is being stripped to recover dehydrogenated hydrocarbons therefrom and the treating solution is contacted within the vapors as these are being recovered from said absorption oil.

3. A method according to claim 2 wherein the treating solution is sprayed into a stripping tower in which said vapors have been removed from the absorption oil by stripping, with steam, and there is effected spray contact of said vapors with said solution, the solution is removed from the stripping zone and vapors thus treated are separately recovered as overhead from said zone.

4. A method as described in claim 3 wherein a $C_4$ or $C_5$ olefin hydrocarbon-containing stream has been subjected to oxidative dehydrogenation for the production of a diene and the treating solution is an aqueous solution of an alkaline material.

5. A method according to claim 4 wherein the alkaline material is selected from soda ash, KOH, a bisulfite or a nitrite.

6. A method according to claim 1 wherein the vapors are recovered from an absorption oil which in lean state has been used to absorb said carbonyls and/or residual oxygen from vapors resulting from an oxidative dehydrogenation of an olefin hydrocarbon in the production of butadiene or isoprene, the treating agent solution contains an alkaline material, the carbonyls and/or residual oxygen are in the vapors which are recovered from the absorption oil by stripping result from the oxidative dehydrogenation and are present in the approximate range of from about 0.05 to about 1 percent of the dehydrogenation effluent.

References Cited
UNITED STATES PATENTS

| | | | |
|---|---|---|---|
| 2,414,817 | 1/1947 | Kleiber et al. | 260—681.5 |
| 2,952,631 | 9/1960 | Hausch | 203—42 |
| 3,096,274 | 7/1963 | Palmer | 202—198 |
| 3,340,160 | 9/1967 | Waldby | 260—666.5 UX |
| 3,412,171 | 11/1968 | Welch et al. | 260—681.5 |
| 3,425,935 | 2/1969 | Cahn | 203—36 |
| 3,448,015 | 6/1969 | Rogers | 260—666.5 |
| 3,475,329 | 10/1969 | Little et al. | 203—42 |
| 3,531,541 | 9/1970 | Woerner | 260—680 E |
| 3,536,775 | 10/1970 | Hutson et al. | 260—681.5 R |

WILBUR L. BASCOMB, JR., Primary Examiner

U.S. Cl. X.R.

203—33, 37, 90, 96; 260—681.5; 202—198